(12) United States Patent
Quiros

(10) Patent No.: US 6,197,162 B1
(45) Date of Patent: Mar. 6, 2001

(54) LIQUID PURIFYING DISTILLATION PROCESS

(76) Inventor: Jose M. Quiros, 5385 Strasbourg Ave., Irvine, CA (US) 92604

( * ) Notice: Subject to any disclaimer, the term of this patent is extended or adjusted under 35 U.S.C. 154(b) by 0 days.

(21) Appl. No.: 09/154,918

(22) Filed: Sep. 17, 1998

(51) Int. Cl.[7] .............................. B01D 3/10; B01D 3/34; C02F 1/04
(52) U.S. Cl. .................... 203/11; 203/49; 203/31; 203/40; 203/91; 203/10; 159/16.1; 210/758; 95/266
(58) Field of Search .................. 203/11, 10, 91, 203/49, 31, 40; 202/205; 95/246, 247, 266; 261/114.1; 210/760, 774, 758; 96/198

(56) References Cited

U.S. PATENT DOCUMENTS

| | | |
|---|---|---|
| 1,069,169 * | 8/1913 | Parker .................. 209/168 |
| 2,161,798 | 6/1939 | Carter . |
| 2,427,718 | 9/1947 | Denys . |
| 2,444,527 | 7/1948 | Pomeroy . |
| 3,565,767 * | 2/1971 | Light ...................... 203/11 |
| 3,679,053 | 7/1972 | Koulovatos et al. . |
| 3,790,368 | 2/1974 | Olsson et al. . |
| 3,814,397 | 6/1974 | Geist et al. . |
| 3,823,728 | 7/1974 | Burris . |
| 3,853,513 | 12/1974 | Carson . |
| 3,975,241 | 8/1976 | Smith . |
| 4,030,985 | 6/1977 | Barba et al. . |
| 4,108,735 | 8/1978 | Burcaw, Jr. et al. . |
| 4,160,725 | 7/1979 | Josis et al. . |
| 4,236,973 | 12/1980 | Robbins . |
| 4,248,672 | 2/1981 | Smith . |
| 4,260,461 * | 4/1981 | Potharst, Jr. ............ 203/11 |
| 4,267,022 | 5/1981 | Pitcher . |
| 4,294,703 * | 10/1981 | Wilms et al. ............ 210/631 |
| 4,312,710 | 1/1982 | Tanaka et al. . |
| 4,326,923 | 4/1982 | Mortenson . |
| 4,332,687 * | 6/1982 | Daignault et al. .......... 210/721 |
| 4,335,576 | 6/1982 | Hopfe . |
| 4,366,030 | 12/1982 | Anderson . |
| 4,381,971 | 5/1983 | Dietrick . |
| 4,390,396 | 6/1983 | Koblenzer . |
| 4,396,463 | 8/1983 | Josis et al. . |
| 4,404,409 | 9/1983 | Fujiwara et al. . |
| 4,406,748 | 9/1983 | Hoffman . |
| 4,412,924 | 11/1983 | Feather . |
| 4,421,461 | 12/1983 | Hicks et al. . |
| 4,444,623 | 4/1984 | Youngner . |
| 4,526,692 | 7/1985 | Yohe et al. . |
| 4,555,307 * | 11/1985 | Hagen . |
| 4,564,447 * | 1/1986 | Tiedemann . |
| 4,582,610 * | 4/1986 | Baker . |
| 4,584,061 * | 4/1986 | Shelton . |
| 4,595,460 | 6/1986 | Hurt . |
| 4,601,789 * | 7/1986 | Bjorklund ............... 202/197 |
| 4,663,089 * | 5/1987 | Lowry et al. . |
| 4,686,009 * | 8/1987 | Mc Cabe . |

(List continued on next page.)

OTHER PUBLICATIONS

"The Adsorptive Bubble Separation Techniques (The Adsubble Techniques) Foam Fractionation and Allied Processes", Lemlich, Robert, Chemical Abstracts, vol. 86. No. 18, May 2, 1977.*

*Primary Examiner*—Virginia Manoharan
(74) *Attorney, Agent, or Firm*—Price and Gess

(57) ABSTRACT

A method of remediating water contaminated by dissolved gases and liquids and suspended particles wherein the contaminated water is collected into a closed container without filling the container and heated to a temperature below the boiling point of water. Negative pressure is then drawn on the closed container without causing the water in the container to boil, whereby the dissolved gases and liquids in the contaminated water, having a boiling point lower than water, will evaporate out of the water into the head space above the water in the container. Finally, atmospheric air and/or oxygen are allowed into the container to push the vapors out of the head space of the container.

6 Claims, 2 Drawing Sheets

U.S. PATENT DOCUMENTS

| | | |
|---|---|---|
| 4,696,718 * | 9/1987 | Lasater . |
| 4,724,048 * | 2/1988 | Helmich . |
| 4,756,724 * | 7/1988 | Yuill . |
| 4,770,748 * | 9/1988 | Cellini et al. . |
| 4,906,338 * | 3/1990 | De Loach . |
| 4,954,223 | 9/1990 | Leary et al. . |
| 4,985,122 | 1/1991 | Spencer . |
| 5,032,230 | 7/1991 | Shepherd . |
| 5,045,215 | 9/1991 | Lamarre . |
| 5,049,240 | 9/1991 | Hamer et al. . |
| 5,064,505 | 11/1991 | Borgren . |
| 5,118,629 | 6/1992 | Quiros et al. . |
| 5,248,394 | 9/1993 | Schlesinger et al. . |
| 5,248,395 | 9/1993 | Rastelli et al. . |
| 5,340,444 | 8/1994 | Van Der Heijden . |
| 5,352,276 | 10/1994 | Rentschler et al. . |
| 5,386,065 | 1/1995 | Kruse et al. . |
| 5,441,606 | 8/1995 | Schlesinger et al. . |
| 5,538,598 | 7/1996 | Schlesinger et al. . |
| 5,616,217 | 4/1997 | Taylor . |
| 5,630,914 * | 5/1997 | Sachdeva et al. ............... 203/49 |
| 5,639,355 | 6/1997 | Jongenburger . |

* cited by examiner

LIQUID PURIFYING DISTILLATION PROCESS

BACKGROUND OF THE INVENTION

1. Field of the Invention

One of the major problems facing future generations is polluted water. Increasing world population and rapid industrial growth combine to cause tremendous contamination problems in the world's rivers, lakes and oceans with an infinite variety of chemical and biological substances. Purification systems that can quickly and economically provide abundant amounts of fresh water from sewage or contaminated water will be and are in great demand.

2. Description of Related Art

A vacuum distillation system should be able to purify any contaminated liquid, such as water from a polluted river. While the prior art systems achieve this to a limited degree, there are significant commercial drawbacks.

To increase the efficiency of a distillation process, use of a vacuum has been tried. For example, U.S. Pat. No. 5,538,598 describes a distillation purifying system which creates a vacuum pressure that is transmitted throughout the system.

U.S. Pat. No. 5,441,606 discusses a distillation purifying system that uses an open tube bundle heat exchanger that heats the liquid (in this case, seawater) to facilitate vigorous evaporation resulting in the separation of salt and other contaminants from the water vapor.

Many of these inventions are unduly complex, uneconomical or not as efficient as the trade requires. The present invention overcomes these drawbacks to provide an advance to the art.

SUMMARY OF THE INVENTION

This invention relates to liquid purification systems that provide for inexpensive sterilization of water contaminated by liquid and/or solid matter, such as sewage or chemical waste. The invention is particularly effective in removing contaminants, such as, methyl tertiary butyl ethers (MTBE), hydrocarbons, alcohols, ethers, and any liquid with a greater volatility than that of water. The present invention enhances the removal of the contaminants by collecting the contaminated water into a closed container without filling it, heating the water in the container to a temperature below the boiling point of water and drawing a negative pressure on the closed container without causing the water in the container to boil. The dissolved gases and liquids in the contaminated water, having a boiling point lower than water, will evaporate out of the water into the head space above the water in the container. Further, by allowing atmospheric air into the container, vapors are pushed out of the head space of the container.

BRIEF DESCRIPTION OF THE DRAWINGS

Further aspects of the invention will be apparent when the description and claims set forth below are considered in conjunction with the accompanying drawings.

DETAILED DESCRIPTION OF THE PREFERRED EMBODIMENTS

The following description is provided to enable any person skilled in the art to make and use the invention and sets forth the best modes, contemplated by the inventor, for carrying out his invention. Various modifications, however, will remain readily apparent to those skilled in the art, since the generic principles of the present invention have been defined herein specifically to provide an easily implemented liquid purifying distillation process.

Figure 1:
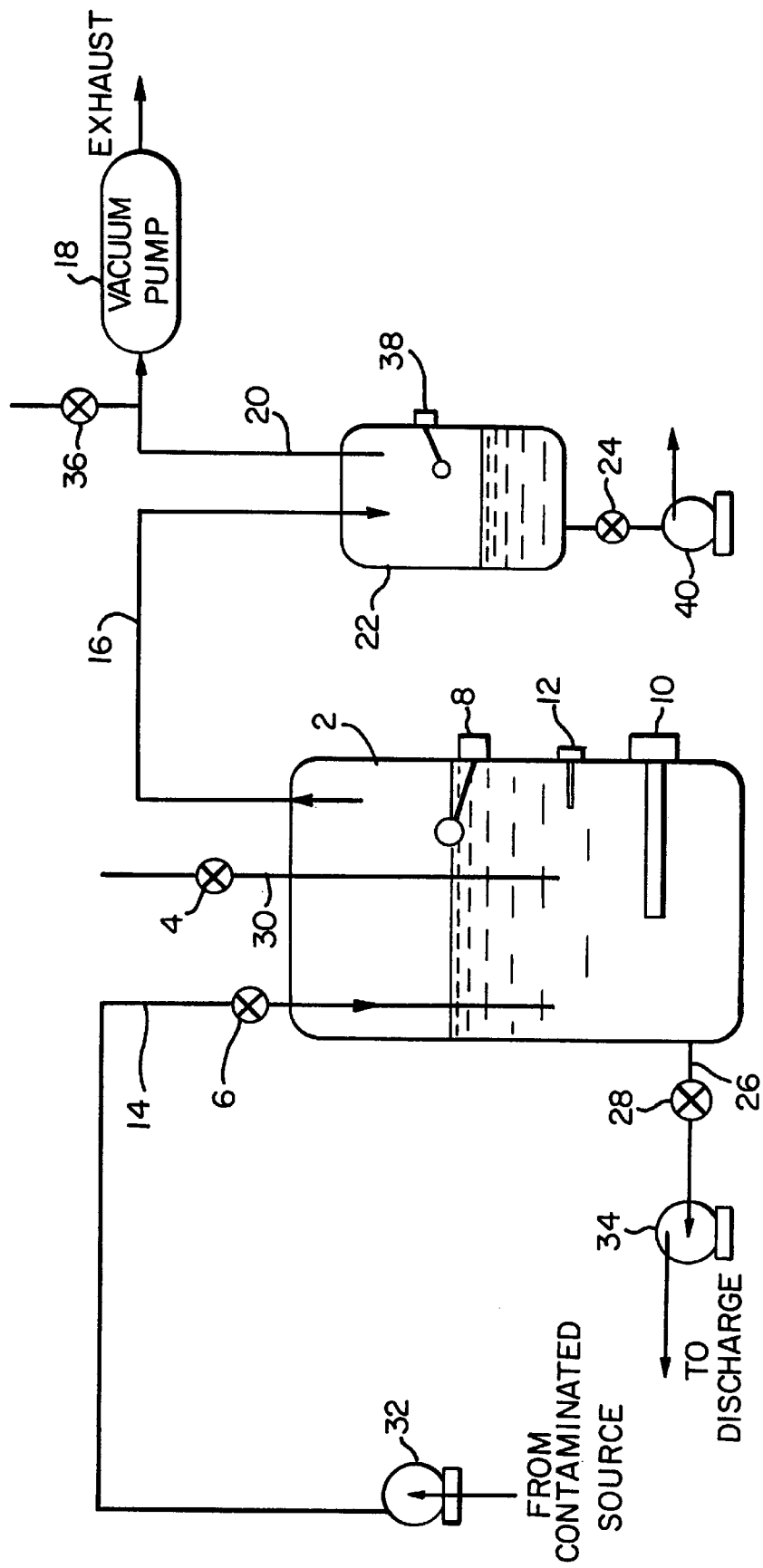
FIG. 1 is a fragmentary elevational view of an improved vacuum distillation system constructed in accordance with the present invention.

As shown in FIG. 1, pump 32 transports contaminated water from a source through a conduit 14, into a container 2 via a valve 6 until it is filled to a desired level as regulated by a level control 8. The contaminated water, heated by a heater 10 and monitored by a thermostat 12, maintains a temperature below the boiling point of water. Contaminants dissolve in water at temperatures below their own boiling points and the boiling point of water. These contaminants may be any one or more of MTBE, glycerine, ethyl and methyl alcohol, and sulfuric, acetic, nitric acids and the like. As the vapor pressure of the contaminants rise with the temperature of the water, the tendency for the contaminants to escape into a vapor state increases. A vacuum pump 18 creates a partial vacuum in the ullage of container 2 and a condensate container 22. The vacuum pump 18 attaches to the condensate container 22 via a conduit 20. The level control 38 determines the level of the contaminants in the condensate container 22. When the level of contaminants exceed the desired amount, a valve 24 opens and a pump 40 activates in order to remove contaminants. The contaminants may be removed manually as well. The amount of vacuum pressure and the temperature of the water are kept at a level so that the water does not boil. This temperature-pressure combination will ensure that contaminants in the water, having a boiling point lower than that of water, are evaporated, thus separating and permitting their extraction from the water. As these contaminants evaporate, their vapor fills the ullage space in container 2 until the ullage becomes saturated. Evaporation of the contaminants stop when the vapors and the liquid reach a state of equilibrium.

Since evaporation ceases as the ullage space becomes saturated, the process allows for the removal and replacement of the saturated vapors in the ullage with air, thus allowing evaporation to continue. This sequence is continuous. The rate of exchange of the ullage space may be determined by conducting tests to determine the time required to saturate the ullage space. The time required to process a "batch" in container 2 may be determined by testing and analyzing samples of the contaminated water.

If valve 4, which is open to the atmosphere, is opened, a stream of air is forced into container 2 through an inlet pipe 30 because of the partial vacuum generated by the vacuum pump 18. The air stream displaces the saturated vapor in the ullage, and transports it to the condensate container 22 through conduit 16, where the vapors are condensed and collected as contaminants. After a predetermined time, valve 4 may be closed and the evaporation of contaminants is allowed to continue, saturating the ullage space again. The air stream may be introduced in a specific sequence of allowing saturation of the ullage space, and thus removal of the saturated vapors, this sequence being repeated throughout the entire remediation process. Unexpectedly good results have been obtained also by simply allowing the air stream to be continuous and uninterrupted.

In an alternate embodiment, the removal of contaminants in the water is enhanced introducing air, in the form of bubbles, and oxygen, in the form of hydrogen peroxide or ozone, into the contaminated water. The bubbles, after coming into contact with the contaminants, adsorb the contaminants with other adsorbed contaminants and rise to the surface of the water. When the air bubbles reach the surface of the water, they release the adsorbed contaminants. The combination of the presence of oxygen in the form of hydrogen peroxide and/or ozone and the higher temperature of the water increases the oxidizing process of MTBE, hydrocarbons, alcohols and ethers. Ozone and/or hydrogen peroxide is introduced into the container 2.

When the contaminated water in processing tank 2 has been remediated to a desired level, some of the water (the desired batch size) in container 2 is removed through an outlet conduit 26 and discharged to a desired location by a pump 34. Container 2 is then again filled with contaminated water from a contaminated source through conduit 14 via pump 32, and the process is repeated. The contaminated exhaust of vacuum pump 18 must be controlled, remediated and released to the atmosphere as required by local environmental regulations. This can be done in a manner well known in the trade.

Figure 2:
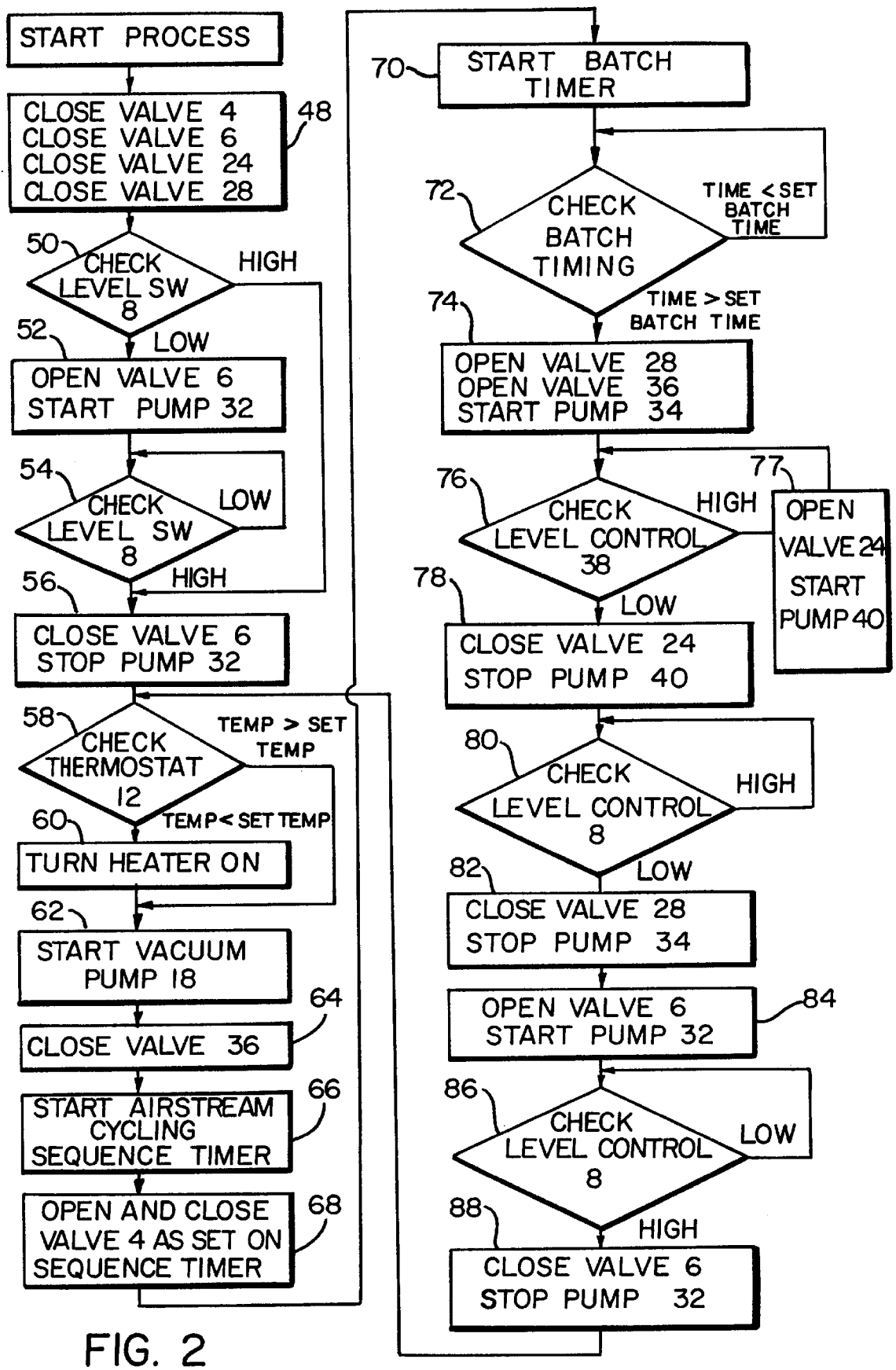
FIG. 2 is a diagram of a distillation process.

As shown in FIG. 2, a distillation process commences with a functional box, step 48, that closes valves 4, 6, 24 and 28. Decisional box, step 50, requires the checking of level switch 8. If check level switch 8 indicates that the level is high, step 50 will skip to step 56 where valve 6 closes and pump 32 stops. If check level switch 8 shows that the level is low, step 50 advances to functional box, step 52 where valve 6 is opened and pump 32 starts. Step 52 proceeds to decisional box, step 54 which continues to functional box, step 56 if check level switch 8 confirms that the level is high. Until check level switch 8 indicates that the level is high, step 54 will result in a loop. Step 56 closes valve 6 and stops pump 32 and proceeds to decisional box, step 58 which checks thermostat 12. If the temperature is less than the set temperature, step 58 advances to functional box, step 60 which turns a heater 10 on. Step 60 proceeds to functional box, step 62 which starts vacuum pump 18. If the temperature is above the set temperature, step 58 progresses to step 62. Step 62 advances to functional box, step 64 which closes valve 36. Step 64 continues to functional box, step 66 which starts air stream cycling sequence time. Step 66 proceeds to functional box, step 68 that opens and closes valve 4 as set on sequence timers. Step 68 advances to functional box, step 70 which starts a batch timer. Upon completion, decisional box, step 72 checks batch timing. If the time is less than the set batch time, a loop will result until the time is greater than the set batch time. When the time is greater than the set batch time, step 72 advances to functional box, step 74, which opens valves 28 and 36 and starts pump 34. Step 74 proceeds to decisional box, step 76 which checks level control 38. If level control 38 indicates that the level is high, a loop will result causing functional box, step 77 to open valve 24 and start pump 40 until level control 38 confirms that the level is low, which results in the closing of valve 24 and pump 40 to stop (shown in functional box, step 78). Step 78 progresses to decisional box, step 80 which checks level control 8. When the level control indicates that the level is high, a loop will result until level control 8 shows the level is low. If level control 8 confirms that the level is low, step 80 advances to functional box, step 82 which closes valve 28 and stops pump 34. Step 82 proceeds to functional box, step 84 that opens valve 6 and starts pump 32. Step 84 progresses to decisional box, step 86 which checks level control 8. When check level control 8 indicates that the level is low, a loop results until check level control 8 shows that the level is high. When the level is high, step 86 advances to functional box, step 88 which closes valve 6 and stops pump 32. Step 88 skips to step 58 to complete the distillation process loop.

Having illustrated and described a preferred embodiment as well as variants of this invention, it will be obvious to those skilled in the art that further changes and modifications may become apparent. Such changes and modifications are to be considered within the scope and essence of this invention.

The features of the present invention, which are believed to be novel, are set forth with particularity in the appended claims.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method of remediating water contaminated by dissolved gases and liquids and suspended particles, the steps of the method comprising:

collecting the contaminated water solution into a closed container without filling it;

heating the solution in the container to a temperature below its boiling point;

drawing a negative pressure on the closed container without causing the solution in the container to boil;

whereby the dissolved gases and liquids in the contaminated water solution having a boiling point lower than the solution will evaporate out of the solution into the head space above the solution in the container;

directing atmospheric air into the container in a continuous flow into the heated solution to bubble through the solution to help evaporate and entrain contaminants to be carried into the vapor contained in the head space of the container and push the contaminated vapors out of the head space of the container; and allowing oxygen into the container to oxidize the contaminants in the container.

2. The method of claim 1 further comprising the step of drawing the contaminated vapors into a condensate tank.

3. A method of remediating water contaminated by dissolved gases and liquids and suspended particles the steps of the method comprising:

collecting the contaminated water solution into a closed container without filling it;

heating the solution in the container to a temperature below its boiling point;

drawing a negative pressure on the closed container without causing the solution in the container to boil;

whereby the dissolved gases and liquids in the contaminated water having a boiling point lower than the solution will evaporate into the head space above the solution in the container; and directing air into the heated contaminated water solution to bubble through the solution to help evaporate the contaminants remaining into the head space of the container.

4. The method of claim 3 wherein the step of directing air into the container comprises a cycle of periods of air being let in with periods of no air being let in.

5. The method of claim 3 wherein the step of directing air into the container comprises a continuous flow of air into the container.

6. The method of claim 3 further comprising the step of drawing the contaminants in the head space of the container into a condensate tank.

\* \* \* \* \*